United States Patent [19]

Yamamura et al.

[11] Patent Number: 5,217,826
[45] Date of Patent: Jun. 8, 1993

[54] LITHIUM-ION CONDUCTING SOLID ELECTROLYTE

[75] Inventors: Yasuharu Yamamura, Katano; Masaki Hasegawa, Hirakata; Kazunori Takada, Osaka; Shigeo Kondo, Hirakata, all of Japan

[73] Assignee: Matsushita Electric Industrial Co., Ltd., Osaka, Japan

[21] Appl. No.: 737,099

[22] Filed: Jul. 29, 1991

[30] Foreign Application Priority Data

Jul. 31, 1990 [JP] Japan .................................. 2-203276
Nov. 29, 1990 [JP] Japan .................................. 2-335901

[51] Int. Cl.$^5$ .......................... H01M 6/18; H01B 1/00
[52] U.S. Cl. .................................. 429/191; 252/62.2; 252/500; 252/512; 252/518
[58] Field of Search ............. 252/500, 512, 518, 62.2; 429/188, 191, 197, 205, 206, 218

[56] References Cited

U.S. PATENT DOCUMENTS

| | | | |
|---|---|---|---|
| 3,506,491 | 4/1970 | Buzzelli | 136/6 |
| 4,184,015 | 1/1980 | Reau et al. | 429/193 |
| 4,434,216 | 2/1984 | Joshi et al. | 429/191 |
| 4,465,745 | 8/1984 | Akridge | 429/191 |
| 4,513,070 | 4/1985 | Carette et al. | 429/193 |

FOREIGN PATENT DOCUMENTS

| | | |
|---|---|---|
| 0206339 | 12/1986 | European Pat. Off. . |
| 0219597 | 4/1987 | European Pat. Off. . |
| 2521125 | 8/1983 | France . |
| 2629639 | 10/1989 | France . |
| 60-160570 | 8/1985 | Japan . |

OTHER PUBLICATIONS

Akridge, J. R. and Vourlis, H. "Performance of Li/-TiS$_2$ Solid State Batteries Using Phosphorous Chalcogenide Network Former Glasses As Solid Electrolyte", Solid State Ionics, 28-30 pp. 841-846 (1988).

*Primary Examiner*—Mark L. Bell
*Assistant Examiner*—Michael A. Marcheschi
*Attorney, Agent, or Firm*—Panitch Schwarze Jacobs & Nadel

[57] ABSTRACT

A lithium-ion conducting solid electrolyte of the present invention comprises a parent material, a lithium-ion conducting sulfide glass represented by the formula Li$_2$S—X (X is at least one sulfide selected from the group consisting of B$_2$S$_3$, SiS$_2$, P$_2$S$_5$, Al$_2$S$_3$, and GeS$_2$), and a high-temperature lithium-ion conducting compound (i.e. Li$_3$PO$_4$ or Li$_2$SO$_4$). The lithium-ion conducting solid electrolyte has higher ionic conductivity and higher decomposition voltage compared to the parent material. By the use of this solid electrolyte for electrical/chemical components such as batteries, condensers, electrochromic displays, and the like, electronic apparatus that includes such elements may have improved performance.

1 Claim, No Drawings

LITHIUM-ION CONDUCTING SOLID ELECTROLYTE

BACKGROUND OF THE INVENTION

1. Field of the Invention:

The present invention relates to a lithium-ion conducting solid electrolyte. More particularly, it relates to a lithium-ion conducting solid electrolytes that are used in solid-state electrical/chemical elements such as solid-state batteries, solid electrolyte double-layered capacitors, solid electrochromic displays, and the like.

2. Description of the Prior Art:

In recent years, the progress in technology of electronic industries is remarkable. Electronic devices such as integrated circuits (IC), large scaled integrated circuits (LSI), and the like are used in various fields to make electronic apparatus smaller and thinner. However, diminishment in size of conventional electrical/-chemical elements that include electrolytic solution is limited, because sealing of the elements requires highly advanced techniques and the proportion of sealing materials in them become larger as they are diminished in size. In contrast to the conventional elements, solid-state electrical/chemical elements, which consist of solid components can be diminished in size readily, because in such solid elements, the seal is not needed. Solid electrolytes, solid-state ion conductors that can transport ions, are essential for constructing such solid-state elements and thus new materials for solid electrolytes are now being developed.

One example is the application of lithium-ion conducting polyelectrolyte, which can be processed readily and has flexibility, to batteries and the like. Typical example of this is poly(oligooxyethylene methacrylate)-alkaline metal system, although it is still under investigation, because of several problems. The problems are that the maximum ionic conductivity of the system, which is about $10^{-5}$ S/cm, does not reach the level required for practical use and that not only cation ($Li^+$), but also anions (e.g. $ClO_4^-$) are transported in the system. Further, this polyelectrolyte is reactive with a lithium metal that is used for an anode.

As for inorganic lithium-ion conducting solid electrolytes, of which conductivities are about $10^{-3}$ S/cm, $LiI-Li_2S-X$ (wherein X is at least one sulfide selected from the group consisting of $B_2S_3$, $SiS_2$, $P_2S_5$, $Al_2S_3$, and $GeS_2$) and $Li_3N$ system are well known. However, they are not put to practical use, because their decomposition voltages are below 3.0 V.

SUMMARY OF THE INVENTION

The lithium-ion conducting solid electrolyte of this invention, which overcomes the above-discussed and numerous other disadvantages and deficiencies of the prior art, comprises a lithium-ion conducting sulfide glass represented by the formula $Li_2S-X$ (wherein X is at least one sulfide selected from the group consisting of $B_2S_3$, $SiS_2$, $P_2S_5$, $Al_2S_3$, and $GeS_2$) and a high-temperature lithium-ion conducting compound, which becomes a lithium-ion conductor at a temperature ranging from 400° C. to 900° C.

In a preferred embodiment, the high-temperature lithium-ion conducting compound is one selected from the group consisting of $Li_3PO_4$ and $Li_2SO_4$.

In a preferred embodiment, the high-temperature lithium-ion conducting compound is $Li_3PO_4$.

In a preferred embodiment, the high-temperature lithium-ion conducting compound is $Li_2SO_4$.

Thus, the invention described herein makes possible the objectives of (1) providing a lithium-ion conducting solid electrolyte having high ionic conductivity; (2) providing a lithium-ion conducting solid electrolyte having ionic conductivity that is stable with time; and (3) providing a lithium-ion conducting solid electrolyte having high decomposition voltage.

DESCRIPTION OF THE PREFERRED EMBODIMENTS

A lithium-ion conducting solid electrolyte of the present invention comprises a lithium-ion conducting sulfide glass represented by the formula $Li_2S-X$ (wherein X is at least one sulfide selected from the group consisting of $B_2S_3$, $SiS_2$, $P_2S_5$, $Al_2S_3$, and $GeS_2$) and a high-temperature lithium-ion conducting compound, wherein $Li_3PO_4$ and $Li_2SO_4$ are preferably used as the compound.

The atomic arrangements in $Li_3PO_4$ or $Li_2SO_4$ are disrupted at high temperature and thus these compounds have high ionic conductivities. When the compounds are cooled to room temperature, their ionic conductivities decrease, because phase transition occurs and their crystal structures are restored.

However, $Li_3PO_4$ or $Li_2SO_4$ may have high conductivity even at room temperature, when they are amorphous. In an amorphous body, atomic arrangements are also disrupted.

Therefore, in the present invention, a glass parent material represented by the formula $Li_2S-X$, is first made to be amorphous and then $Li_3PO_4$ or $Li_2SO_4$ is added to this amorphous material, which results in an amorphous $Li_3PO_4$ or $Li_2SO_4$.

This is accomplished by first heating the mixture of $Li_2S$ and X, and then quenching (or cooling rapidly) it. The molar ratio of $Li_2S$ to X depends on what X is. Preferably, $Li_2S$ is added in a large amount as long as no sediment is deposited. To this amorphous mixture, $Li_3PO_4$ or $Li_2SO_4$ is added and then the mixture heated again. This is followed by quenching. Preferably the amount of $Li_3PO_4$ or $Li_2SO_4$ is 1-5 molar %. The resulting lithium-ion conducting solid electrolyte has higher ionic conductivity and higher decomposition voltage compared to the parent material.

EXAMPLES

Below, the present invention is explained in detail.

To compare a lithium-ion conducting solid electrolyte of the present invention with a corresponding parent material (i.e. sulfide glass) and $LiI-Li_2S-X$ (wherein X is the same sulfide as in the lithium-ion conducting solid electrolyte), electrical/chemical characteristics of all these compositions were evaluated. Conductivity was measured by alternating impedance technique at room temperature. Each of the conductivities and decomposition voltages of $LiI-Li_2S-X$ mentioned herein is the maximum value of the system.

A parent material (i.e. sulfide glass), parent material-forming substances, and a solid electrolyte synthesized in the present invention are decomposed readily in air. Therefore, all of the procedures described herein were done in dry boxes that are filled with argon gas. $Li_3PO_4$ and $Li_2SO_4$ were used after drying at 400° C. for 6 hours under reduced pressure.

EXAMPLE 1

First, $Li_2S$ and $SiS_2$, which were in powder form, were mixed in a molar ratio of 1:1, put in a carbon crucible, baked at 950° C. for 1 hour in the stream of argon gas, and quenched in liquid nitrogen to obtain amorphous $0.5Li_2S$-$0.5SiS_2$. Then $Li_2SO_4$ and the amorphous $0.5Li_2S$-$0.5SiS_2$ so obtained and crushed were mixed in a molar ratio of 6:94. The mixture was put in a carbon crucible, baked at 900° C. for 1 hour in the stream of argon gas, and quenched in liquid nitrogen to produce $0.06Li_2SO_4$-$0.47Li_2S$-$0.47SiS_2$.

The ionic conductivities of $0.06Li_2SO_4$-$0.47Li_2S$-$0.47SiS_2$, $0.5Li_2S$-$0.5SiS_2$, and $0.30LiI$-$0.35Li_2S$-$0.35SiS_2$ were $5\times10^{-4}$ S/cm, $1\times10^{-4}$ S/cm, and $3\times10^{-4}$ S/cm, respectively, when they were measured immediately after being synthesized. Four hours later, the ionic conductivity of $0.30LiI$-$0.35Li_2S$-$0.35SiS_2$ decreased by 5%, but those of $0.5Li_2S$-$0.5SiS_2$ and $0.06Li_2SO_4$-$0.47Li_2S$-$0.47SiS_2$ did not change even one month later. The decomposition voltages of $0.06Li_2SO_4$-$0.47Li_2S$-$0.47SiS_2$, $0.5Li_2S$-$0.5SiS_2$, and $0.30LiI$-$0.35Li_2S$-$0.35SiS_2$ were about 4.0 V, 4.0 V, and 2.9 V, respectively.

EXAMPLE 2

First, $Li_2S$ and $B_2S_3$, which were in powder form, were mixed in a molar ratio of 1:1, put in a quartz glass-tube and sealed under reduced pressure, baked at 500° C. for 12 hours and then at 800° C. for 3 hours in the stream of argon gas, and quenched in liquid nitrogen to obtain amorphous $0.5Li_2S$-$0.5B_2S_3$. Then $Li_2SO_4$ and the amorphous $0.5Li_2S$-$0.5B_2S_3$ so obtained and crushed were mixed in a molar ratio of 6:94. The mixture was put in a quartz glass-tube and sealed under reduced pressure, baked at 900° C. for 1 hour in the stream of argon gas, and quenched in liquid nitrogen to produce $0.06Li_2SO_4$-$0.47Li_2S$-$0.47B_2S_3$.

The ionic conductivities of $0.06Li_2SO_4$-$0.47Li_2S$-$0.47B_2S_3$, $0.5Li_2S$-$0.5B_2S_3$, and $0.4LiI$-$0.3Li_2S$-$0.3B_2S_3$ were $4\times10^{-4}$ S/cm, $1\times10^{-4}$ S/cm, and $4\times10^{-4}$ S/cm respectively, when they were measured immediately after being synthesized. Four hours later, the ionic conductivity of $0.4LiI$-$0.3Li_2S$-$0.3B_2S_3$ decreased by 5%, but those of $0.5Li_2S$-$0.5B_2S_3$ and $0.06Li_2SO_4$-$0.47Li_2S$-$0.47B_2S_3$ did not change even one month later. The decomposition voltages of $0.06Li_2SO_4$-$0.47Li_2S$-$0.47B_2S_3$, $0.5Li_2S$-$0.5B_2S_3$, $0.4LiI$-$0.3Li_2S$-$0.3B_2S_3$ were about 4.0 V, 4.0 V, and 2.9 V, respectively.

EXAMPLE 3

First, $Li_2S$ and $P_2S_5$, which were in powder form, were mixed in a molar ratio of 2:1, put in a quartz glass-tube and sealed under reduced pressure, baked at 500° C. for 12 hours and then at 800° C. for 3 hours in the stream of argon gas, and quenched in liquid nitrogen to obtain amorphous $0.67Li_2S$-$0.33P_2S_5$. Then $Li_2SO_4$ and the amorphous $0.67Li_2S$-$0.33P_2S_5$ so obtained and crushed was mixed in a molar ratio of 7:93. The mixture was put in a quartz glass-tube and sealed under reduced pressure, baked at 900° C. for 1 hours, and quenched in liquid nitrogen to produce $0.07Li_2SO_4$-$0.62Li_2S$-$0.31P_2S_5$.

The ionic conductivities of $0.07Li_2SO_4$-$0.62Li_2S$-$0.31P_2S_5$, $0.67Li_2S$-$0.33P_2S_5$, and $0.45LiI$-$0.37Li_2S$-$0.18P_2S_5$ were $4\times10^{-4}$ S/cm, $1\times10^{-4}$ S/cm, and $2\times10^{-4}$ S/cm, respectively, when they were measured immediately after being synthesized. Four hours later, the ionic conductivity of $0.45LiI$-$0.37Li_2S$-$0.18P_2S_5$ decreased by 5%, but those of $0.67Li_2S$-$0.33P_2S_5$ and $0.07Li_2SO_4$-$0.62Li_2S$-$0.31P_2S_5$ did not change even one month later. The decomposition voltages of $0.07Li_2SO_4$-$0.62Li_2S$-$0.31P_2S_5$, $0.67Li_2S$-$0.33P_2S_5$, and $0.45LiI$-$0.37Li_2S$-$0.18P_2S_5$ were about 4.0 V, 4.0 V and 2.9 V, respectively.

EXAMPLE 4

First, $Li_2S$ and $SiS_2$, which were in powder form, were mixed in a molar ratio of 3:2, put in a glass-like carbon crucible, baked at 950° C. for 1.5 hours in the stream of argon gas, and quenched in liquid nitrogen to obtain amorphous $0.6Li_2S$-$0.4SiS_2$. Then $Li_3PO_4$ and amorphous $0.6Li_2S$-$0.4SiS_2$ so obtained and crushed were mixed in a molar ratio of 3:97. The mixture was put in a glass-like carbon crucible, baked at 950° C. for 1.5 hours in the stream of argon gas, and quenched in liquid nitrogen to produce $0.03Li_3PO_4$-$0.58Li_2S$-$0.39SiS_2$.

The ionic conductivities of $0.03Li_3PO_4$-$0.58Li_2S$-$0.39SiS_2$ and $0.6Li_2S$-$0.4SiS_2$ were $7.0\times10^{-4}$ S/cm and $5.3\times10^{-4}$ S/cm, respectively, when they were measured immediately after being synthesized. These values did not change even one month later. Both of the decomposition voltages of $0.03Li_3PO_4$-$0.58Li_2S$-$0.39SiS_2$ and $0.6Li_2S$-$0.4SiS_2$ were about 4.0 V. The results can be compared with those of $0.30LiI$-$0.35Li_2S$-$0.35SiS_2$, which are mentioned in Example 1.

EXAMPLE 5

First, $Li_2S$ and $GeS_2$, which were in powder form, were mixed in a molar ratio of 3:2, put in a glass-like carbon crucible, baked at 950° C. for 1.5 hours in the stream of argon gas, and quenched in liquid nitrogen to obtain amorphous $0.6Li_2S$-$0.4GeS_2$. Then $Li_3PO_4$ and the amorphous $0.6Li_2S$-$0.4GeS_2$ so obtained and crushed were mixed in a molar ratio of 3:97. The mixture was put in a glass-like carbon crucible, baked at 950° C. for 1.5 hours in the stream of argon gas, and quenched in liquid nitrogen to produce $0.03Li_3PO_4$-$0.58Li_2S$-$0.39GeS_2$.

The ionic conductivities of $0.03Li_3PO_4$-$0.58Li_2S$-$0.39GeS_2$, $0.6Li_2S$-$0.4GeS_2$, and $0.30LiI$-$0.35Li_2S$-$0.35GeS_2$ were $3.0\times10^{-4}$ S/cm, $2.0\times10^{-4}$ S/cm, and $4\times10^{-4}$ S/cm, respectively, when they were measured immediately after being synthesized. Four hours later, the ionic conductivity of $0.30LiI$-$0.35Li_2S$-$0.35GeS_2$ decreased by 5%, but those of $0.03Li_3PO_4$-$0.58Li_2S$-$0.39GeS_2$ and $0.6Li_2S$-$0.4GeS_2$ did not change even one month later. The decomposition voltages of $0.03Li_3PO_4$-$0.58Li_2S$-$0.39GeS_2$, $0.6Li_2S$-$0.4GeS_2$, and $0.30LiI$-$0.35Li_2S$-$0.35GeS_2$ were about 4.0 V, 4.0 V, and 2.9 V, respectively.

EXAMPLE 6

First, $Li_2S$ and $P_2S_5$, which were in powder form, were mixed in a molar ratio of 2:1, put in a quartz glass-tube and sealed under reduced pressure, baked at 500° C. for 12 hours and then at 800° C. for 3 hours in the stream of argon gas, quenched in liquid nitrogen to obtain amorphous $0.67Li_2S$-$0.33P_2S_5$. Then $Li_3PO_4$ and the amorphous $0.67Li_2S$-$0.33P_2S_5$ so obtained and crushed were mixed in a molar ratio of 3:97. The mixture was put in a quartz glass-tube and sealed under reduced pressure, baked at 900° C. for 1 hour in the stream of argon gas, and quenched in liquid nitrogen to produce $0.03Li_3PO_4$-$0.65Li_2S$-$0.32P_2S_5$.

The ionic conductivities of $0.03Li_3PO_4$-$0.65Li_2S$-$0.32P_2S_5$ and $0.67Li_2S$-$0.33P_2S_5$ were $4.2 \times 10^{-4}$ S/cm and $3.0 \times 10^{-4}$ S/cm, respectively, when they were measured immediately after being synthesized. The values did not change even one month later. Both of the decomposition voltages of $0.03Li_3PO_4$-$0.65Li_2S$-$0.32P_2S_5$ and $0.67Li_2S$-$0.33P_2S_5$ were about 4.0 V. The results can be compared with those of $0.45LiI$-$0.37Li_2S$-$0.18P_2S_5$, which are mentioned in Example 3.

EXAMPLE 7

First, $Li_2S$ and $B_2S_3$, which were in powder form, were mixed in a molar ratio of 1:1, put in a quartz glass-tube and sealed under reduced pressure, baked at 500° C. for 12 hours and then at 800° C. for 3 hours in the stream of argon gas, and quenched in liquid nitrogen to obtain amorphous $0.5Li_2S$-$0.5B_2S_3$. Then $Li_3PO_4$ and $0.5Li_2S$-$0.5B_2S_3$ so obtained and crushed up were mixed in a molar ratio of 4:96. The mixture was put in a quartz glass-tube and sealed under reduced pressure, baked at 800° C. for 3 hours in the stream of argon gas, and quenched in liquid nitrogen to produce $0.04Li_3PO_4$-$0.48Li_2S$-$0.48B_2S_3$.

The ionic conductivities of $0.04Li_3PO_4$-$0.48Li_2S$-$0.48B_2S_3$ and $0.5Li_2S$-$0.5B_2S_3$ were $3.0 \times 10^{-4}$ S/cm and $2.0 \times 10^{-4}$ S/cm, respectively, when they were measured immediately after being synthesized. The values did not change even one month later. Both of the decomposition voltages of $0.04Li_3PO_4$-$0.48Li_2S$-$0.48B_2S_3$ and $0.5Li_2S$-$0.5B_2S_3$ were about 4.0 V. The results can be compared with those of $0.4LiI$-$0.3Li_2S$-$0.3B_2S_3$, which are mentioned in Example 2.

As described in the examples above, by adding high-temperature a lithium-ion conducting compound (i.e. $Li_3PO_4$ or $Li_2SO_4$) to a lithium-ion conducting sulfide glass, we could obtain a solid electrolyte that has high ionic conductivity and high decomposition voltage. Beside the examples, $Al_2S_3$ can be used as a sulfide glass.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A lithium-ion conducting solid electrolyte comprising $Li_3PO_4$ as a lithium-ion conductor and a lithium-ion conducting sulfide glass represented by the formula $Li_2S$-X (wherein X is at least one sulfide selected from the group consisting of $B_2S_3$, $SiS_2$, $P_2S_5$, $Al_2S_3$, and $GeS_2$), and wherein the amount of $Li_3PO_4$ is 1–5 molar %, and said solid electrolyte is in an amorphous state.

* * * * *